Nov. 22, 1966　　　　E. JONES　　　3,286,838
REFRIGERANT DRIER OR FILTER
Filed March 6, 1963　　　　　　　　3 Sheets-Sheet 2

INVENTOR.
EVAN JONES
BY
Cromwell, Greist & Warden
ATTYS.

Nov. 22, 1966   E. JONES   3,286,838
REFRIGERANT DRIER OR FILTER
Filed March 6, 1963   3 Sheets-Sheet 3
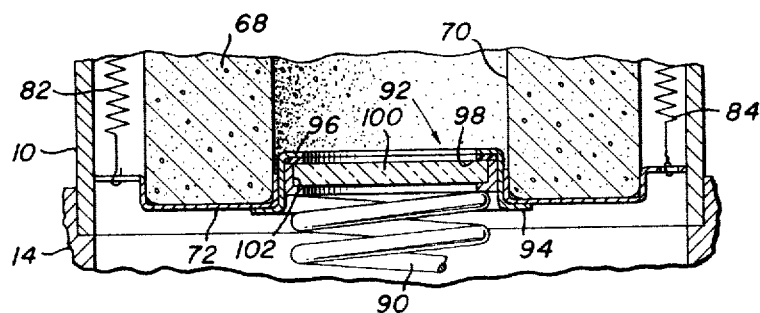
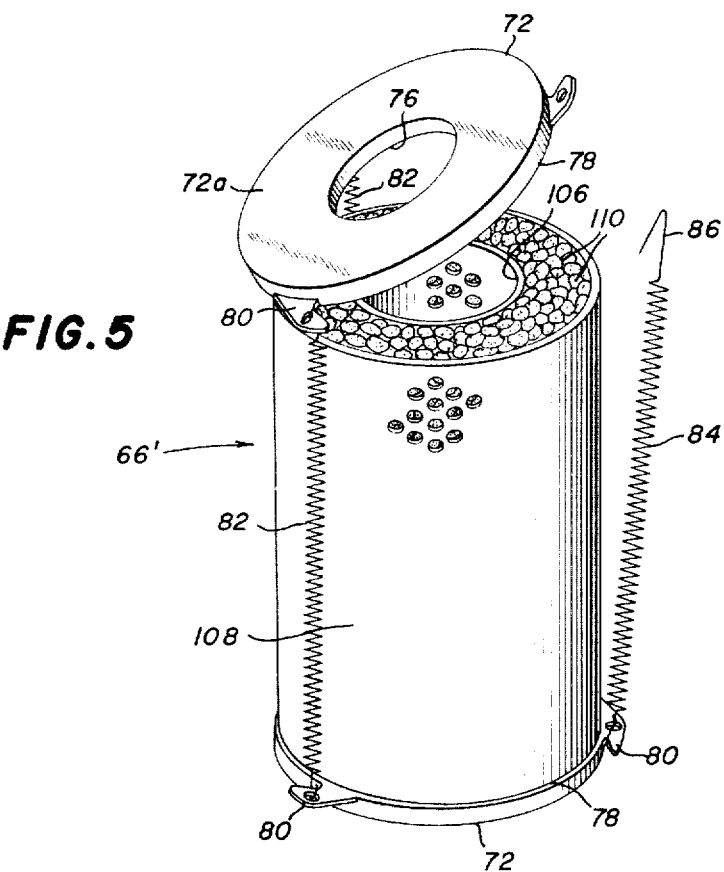
INVENTOR.
EVAN JONES
BY
Cromwell, Greist & Warden
ATTYS.

United States Patent Office 3,286,838
Patented Nov. 22, 1966

3,286,838
REFRIGERANT DRIER OR FILTER
Evan Jones, Evanston, Ill., assignor to Henry Valve Company, Melrose Park, Ill., a corporation of Illinois
Filed Mar. 6, 1963, Ser. No. 263,278
3 Claims. (Cl. 210—95)

The present invention relates to refrigerant purification assemblies, and more particularly to a refrigerant drier or filter including a new and improved drier or filter cartridge unit.

It is a primary object of the present invention to provide an improved form of drier or filter cartridge unit including a cylindrical drier or filter element having novel cap plates removably mounted one at each end thereof.

It is a further object of the present invention to provide an improved form of drier or filter cartridge unit including a cylindrical drier or filter element having novel cap plates removably held one at each end thereof by resilient means wherein the resilient means is detachably engageable with one of the cap plates for removal of the same to permit drier or filter element replacement.

It is an even further object of the present invention to provide an improved form of drier or filter cartridge unit including a cylindrical drier element or filter element having cap plates removably held one at each end thereof, wherein each of the cap plates includes lugs adapted to act as spacers for locating the cartridge unit in concentric spaced relation within a casing, and wherein the lugs serve as mounting means for resilient fastener means, the fastener means being adapted to maintain the cap plates in contact with the ends of the drier or filter element.

It is an even further object of the present invention to provide an improved drier cartridge unit including a cylindrical drier element having novel cap plates removably mounted one at each end thereof, wherein the cap plates are adapted to protect the ends of the drier element and support the same in an improved manner.

It is a still further object of the present invention to provide an improved form of drier or filter cartridge unit including a cylindrical drier or filter element having novel cap plates removably held one at each end thereof, wherein each of the cap plates has an annular planar surface adapted for substantial co-extensive contact with the planar surface of an adjacent cap plate of another cartridge unit for forming a seal between the ends of adjoining drier cartridge units.

It is an even further object of the present invention to provide a refrigerant drier assembly including a sleeve-like casing having at least one drier cartridge unit removably mounted therein, wherein the drier cartridge unit is of the radial flow type including a cylindrical drier element having an axially extending central bore, the drier assembly being provided with novel window means for viewing dehydrated liquid in the central bore of the drier element.

These and other objects and advantages of the invention will become apparent from the following specification wherein like numerals refer to similar parts throughout.

In the drawings:

FIG. 4 is an enlarged fragmentary view of one of the cap plates with one part of the window means detachably mounted thereto; and FIG. 5 is a view similar to FIG. 2 showing the cap plates associated with a different form of drier element.

Figure 1:
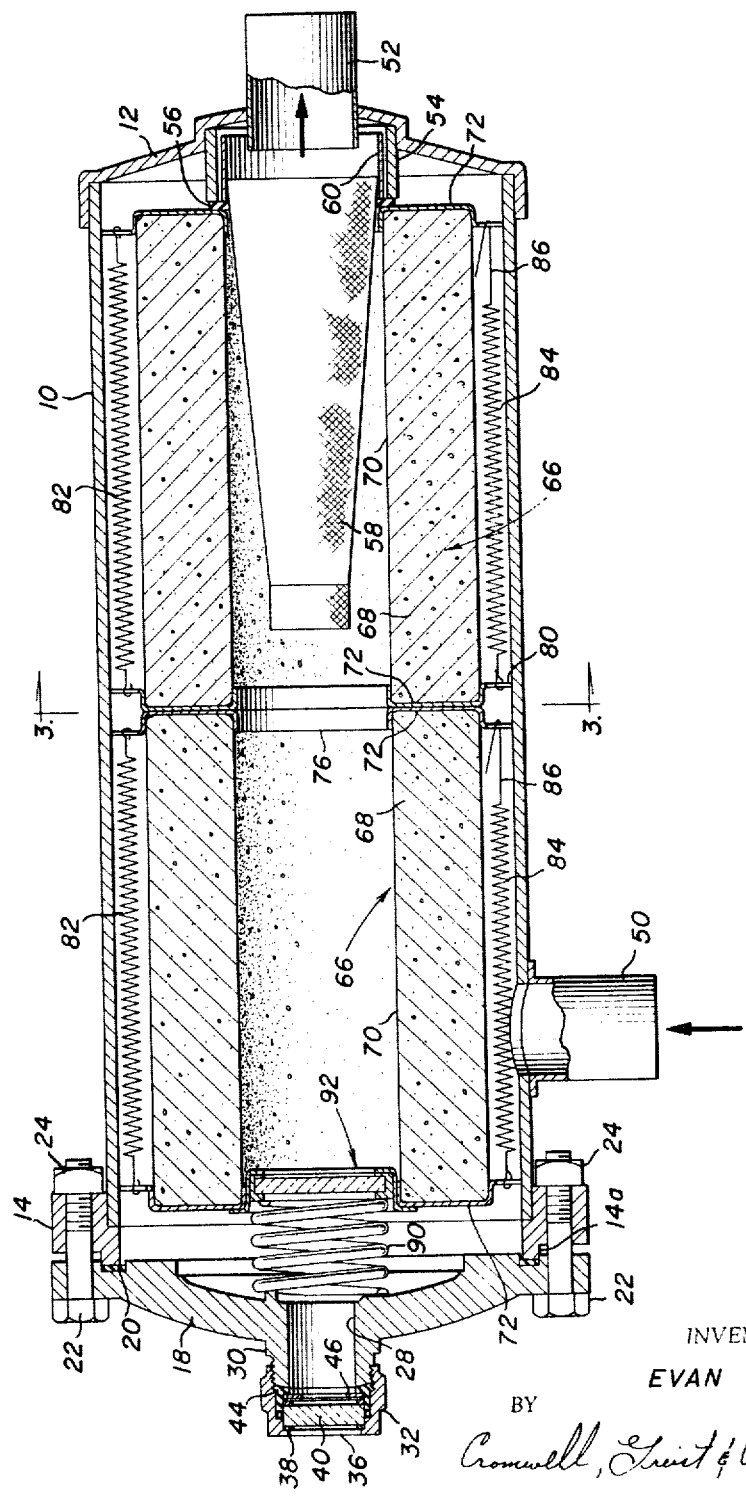
FIG. 1 is a longitudinal central section taken through one embodiment of a refrigerant drier assembly of this invention with certain parts thereof being rotated about the longitudinal center line of the drier for better illustration.

The refrigerant drier assembly shown in FIG. 1 includes a cylindrical sleeve-like casing or housing 10 having a cover plate 12 fixedly mounted at one end thereof and an annular flange ring 14 fixedly mounted at the other end thereof. The drier assembly includes a detachable cover plate 18 for permitting access to the interior on the casing 10 the cover plate 18 being provided with an annular groove containing a ring seal member 20 engageable with an annular lip portion 14a of the flange ring 14 for forming a seal between the cover plate 18 and the flange ring. The cover plate 18 includes a flange portion provided with a plurality of circumferentially spaced apertures in alignment with apertures in the annular flange ring 14. A plurality of bolts 22 and nuts 24 are provided for bolting the cover plate to the annular flange ring. The cover plate 18 further includes a centrally disposed opening 28 and an integral collar 30, which collar is provided with a plurality of threads on the exterior thereof for threading engagement with a cap 32. The cap includes a centrally disposed opening 36 in the face thereof defined by an inturned annular lip 38, which lip is adapted to secure a circular window 40 in place in the cap. A suitable packing ring 44 is provided for forming a seal between the window, cap and collar members. Preferably, the cover plate 18 is provided with a moisture-liquid indicator device as shown in my copending application Serial No. 861,985, filed December 24, 1959, now Patent No. 3,088,811, issued May 7, 1963. It will be understood that such a device, which is indicated as 46 in FIG. 1, includes a number of annular indicating rings mounted between the inner face of the window 40 and an inturned annular lip formed on the packing 44. This indicator has a central transparent portion allowing the interior of the casing 10 to be viewed through the window 40.

The refrigerant drier casing includes a refrigerant flow connection 50 communicating with the interior of the casing through a side wall portion thereof. A second axially disposed refrigerant flow connection 52 is fixedly mounted in a central opening in the cover plate 12. The cover plate 12 includes a cylindrical shell 54 fixedly mounted thereto concentric with the refrigerant flow connection 52. A removable screen assembly including a conical safety screen 58 having one end thereof secured to a cylindrical shell 60 is provided for screening refrigerant before the same is discharged from the refrigerant drier assembly. A gasket 56 adapted to be squeezed between one end of one of the drier cartridge units and the inner end of the shell 54 is provided for preventing dehydrated refrigerant from leaking to the space on the inside of the cover plate 12 surrounding the shell 54. In the embodiment of the drier shown for purposes of illustration, refrigerant fluid is adapted to enter the casing 10 through connection 50 and flow from the casing through connection 52. It will be noted that in the drier assembly of FIG. 1 the moisture-liquid indicator 46 is located to indicate the condition of the refrigerant before the same passes through the drier cartridge units. This arrangement allows an accurate indication to be made as the drier assembly is to be used in a closed system; therefore, the condition of refrigerant fluid entering the connection 50 indicates the dehydrating capabilities of the drier cartridge units.

Figure 2:
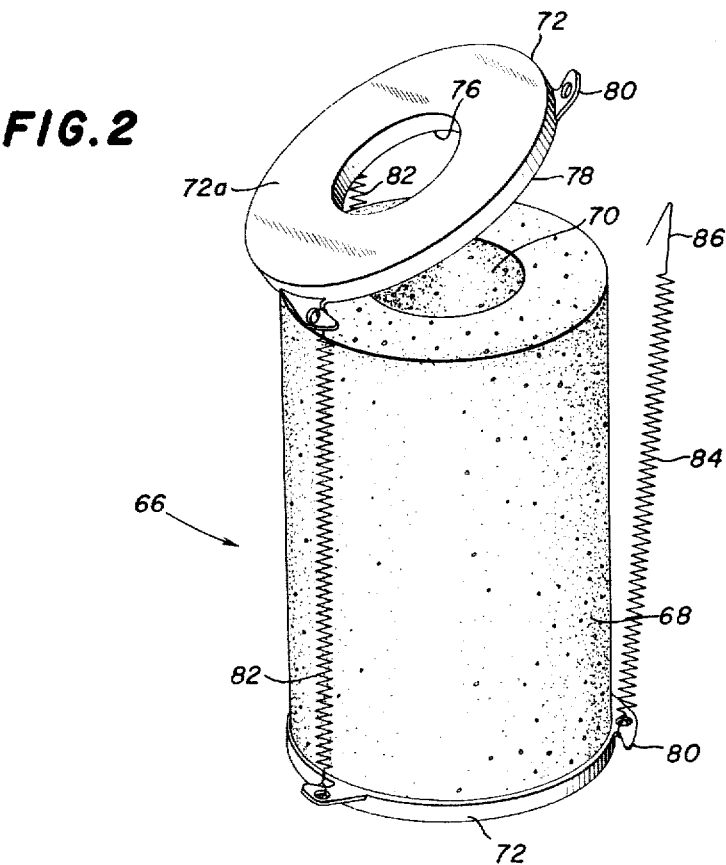
FIG. 2 is a perspective view of a drier cartridge unit of this invention showing one of the cap plates partially removed from one end of the cylindrical drier element.

The refrigerant drier assembly of this invention is adapted to have a plurality of drier cartridge units removably mounted within the casing thereof, each drier cartridge unit being indicated by the general designation 66. Preferably, two drier cartridge units 66 are disposed in end-to-end relationship as shown in FIG. 1. The drier cartridge unit 66 is best illustrated in FIG. 2, and it will be seen to include a cylindrical drier element 68 made from molded dehydrant material. The drier element itself forms no part of the present invention, and the dehydrant material of element 68 may be of any suitable material having the ability to absorb and retain water and water vapor. The drier element includes a centrally disposed axially extending bore 70. It will be understood that refrigerant to be dehydrated flows radially inwardly of the element 68 and then axially in the central bore thereof for discharge through the connection 52.

Figure 3:
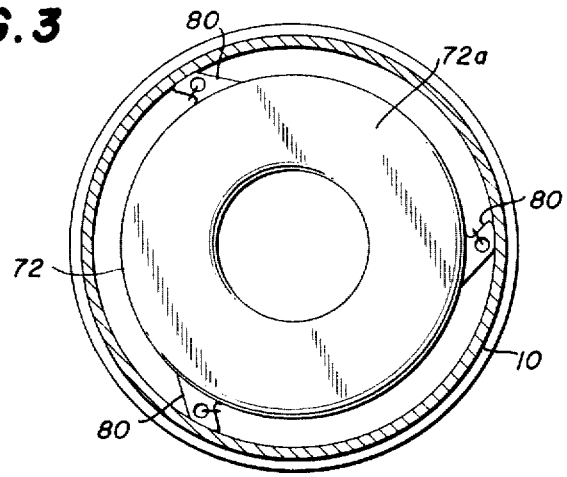
FIG. 3 is a section taken along the line 3—3 of FIG. 1.

The drier cartridge unit 66 includes a pair of novel annular cap plates 72, each of which cap plates is adapted to be removably mounted at each end of the drier element 68. Each cap plate contains circumferentially continuous inner and outer lips 76 and 78, respectively. The inner and outer lips are adapted for respective engagement with the inner and outer walls of the element 68 near the ends thereof. The lips 76 and 78 serve to insure proper mounting of the cap plates with respect to the drier element, and these inner and outer lips serve to prevent crumbling of the molded dehydrant element 68 at the ends of the same. As best seen in FIG. 3, each cap plate includes a plurality (preferably three in number) of integral, equally spaced, generally radially extending, apertured lugs 80. The function of the lugs 80 is two-fold, i.e., the lugs serve as mounting means for cap plate fastening means and the lugs are adapted to act as spacers for locating the drier cartridge unit in concentric spaced relation within the casing 10 of the refrigerant drier assembly.

The dried cartridge unit includes resilient fastening means for securely holding the cap plates 72 in snug engagement with the ends of the drier element 68. As best viewed in FIG. 2, the fastening means are in the form of a plurality of axially extending coil springs 82 and 84. In the embodiment of the cartridge unit shown for purposes of illustration, two springs 82 and one spring 84 are provided. The springs 82 are adapted to have opposite ends thereof in respective engagement with the lugs 80 of the cap plates 72, the ends of the springs 82 being provided with eye portions for permanent engagement with the apertures in the lugs 80. Preferably, the spring 84 has one end thereof permanently secured to one of the lugs 80 of one cap plate, the other end of the spring 84 being provided with a hook 86. The hook 86 is adapted to be detachably received in one of the lugs 80 on one of the cap plates 72, disengagement of the hook 86 from the lug being accomplished by extending or stretching the spring 84. From FIG. 2 it will be apparent that upon detaching of the hook 86 of the spring 84 from one of the lugs of one cap plate, this cap plate may be removed from one end of the drier element by extension of the springs 82 for quick and easy replacement of the drier element.

Reference to FIG. 1 shows two drier cartridge units 66 disposed in end-to-end relation and removably mounted within the casing 10 of the refrigerant drier assembly. As noted in FIGS. 1 and 3, the outer edges of the lugs 80 engage the inside wall of the casing 10 for locating the cartridge units in concentric spaced relation within the casing. Refrigerant liquid flowing into the casing through the connection 50 fills the annular space between the casing wall and outside walls of the drier elements and flows radially inwardly of the drier elements to the central bores 70. Dehydrated refrigerant in the central bores then flows outwardly of the casing (to the right as seen in FIG. 1) through the screen 58 and connection 52. Only a very small amount of refrigerant fluid in the annular space surrounding the drier elements flows inwardly between adjacent cap plates of the cartridge units by virtue of the construction of the cap plates. As noted in FIG. 2, each cap plate includes an annular planar surface 72a. Accordingly, when two cartridge units are placed in end-to-end disposition with adjacent cap plates thereof abutting each other, the annular planar surfaces 72a of the adjacent cap plates are adapted for substantial co-extensive contact with each other thereby forming a seal between adjoining ends of the cartridge units. This seal between adjacent cap plates is not necessarily a liquid-tight seal as planar surfaces 72a are not machined surfaces. The seal between adjacent cap plates is sufficient to prevent the passage of particles which would normally be prevented from passing through the particular drier or filter element itself. A liquid-tight seal is effected at the innermost end of the first inserted drier cartridge unit by tight engagement of the cap plate at the innermost end of this cartridge unit with the gasket 56.

As it will be noted from FIG. 1, the cover plate 18 is dome shaped for defining a chamber between the inside of this cover plate and the outermost end of the last inserted drier cartridge unit. This space is adapted to receive resilient means for holding both drier cartridge units in place in the casing, i.e., with the innermost cap plate of the first inserted cartridge unit in sealing engagement with the gasket 56 and with the cap plates at adjoining ends of the cartridge units in sealing engagement with each other. This resilient means includes a coil spring 90 having one end thereof in engagement with the inside of the cover plate 18 around the opening 28 therein and with the other end of the spring being in engagement with a ring assembly generally designated 92 (see FIG. 4), which ring assembly is adapted to be detachably received in the central opening in the outermost cap plate of the last inserted drier cartridge unit. The ring assembly 92 is adapted to be held in the central opening in this cap plate by an outwardly extending annular lip 94 on the ring assembly, which lip is adapted to engage the annular planar surface of the cap plate. The ring assembly also includes an inwardly extending annular lip 96, which lip serves as a seat for receiving a gasket 98. A circular window 100 mounted in a frame or packing 102 is urged into sealing engagement with the gasket 98 by the spring 90, which spring has the inner end thereof in engagement with the packing 102. Thus the spring 90 holds the ring assembly 92 together and in place in the central opening in the outermost cap plate of the last inserted drier cartridge unit. Also, it will be apparent that the spring 90 acts to hold both drier cartridge units in place in the casing 10.

The provision of the window 98 permits the central bores of the drier elements to be viewed through the transparent portion of the liquid-moisture indicator 46 and window 40. The coil spring 90 is of sufficient size in diameter so as not to obscure the view of the central bores in the drier elements. It is desirable to be able to view the dehydrated refrigerant in the central bores of the drier elements to determine if the drier elements are clogging. Normally, window means are provided in the outlet end of known refrigerant driers. In the drier assembly of this invention wherein the refrigerant flows radially inwardly in the cartridge units, the windows are provided in the inlet end of the drier. With this flow pattern turbulence within the central bores of the drier elements indicates a clogging condition; this test is more effective than attempting to take comparative pressure readings.

FIG. 5 shows a drier cartridge unit 66' having a different form of drier element as a part thereof. The cartridge unit 66' includes a pair of the cap plates 72 and the coil springs 82 and 84 adapted to engage the lugs 80. The drier cartridge element, which of itself is of known construction, includes inner and outer foraminous or perforated shell members 106 and 108 respectively, having discrete particles 110 of dehydrant material firmly packed therebetween. The cap plates are adapted to be held in snug contact with the ends of this drier element with the cap lips 76 and 78 in respective snug engagement with the inside surface of the shell 106 at the ends thereof and with the outside surface of the shell 108 at the ends thereof. The cap plates not only act to enclose the ends of the drier element to prevent loss of the discrete particles 110, but by the action of cap plates lips engaging the shells of the drier element the shells are securely supported and held in proper concentric relationship. Manifestly, the cap plates 72 readily adapt themselves for use with the drier element illustrated in FIG. 5, and the cap plates cooperate with the drier element for providing an improved cartridge unit.

While the embodiment of the invention shown for purposes of illustration is in the form of a refrigerant drier assembly, it will be realized that the principles of the invention apply equally well in a refrigerant filter assembly, or in any type of liquid purification assembly. In other words, a cylindrical or tubular filter element may be provided in lieu of the molded dehydrant drier element 68 or discrete particles 110 and shells 106, 108. For example, a tubular filter element made of wool felt with a suitable binder can be used rather than drier element 68. In such a case the cap plates 72 are adapted to engage the ends of the filter element and support the same in the assembly of FIG. 1 in the same manner as element 68 is supported therein.

It will be apparent that this invention provides a new and improved refrigerant drier or filter assembly including one or more drier or filter cartridge units of novel construction. Each cartridge unit includes a pair of cap plates of unique construction, which cap plates protect the ends of a drier or filter element and which cap plates are adapted to form a seal between adjacent ends of end-to-end disposed drier cartridge units. Further, the unique cap plates include lugs, which lugs serve as mounting means for the resilient fastening means and which lugs are adapted to act as spacers for locating the cartridge units in concentric spaced relation within the casing of a refrigerant drier or filter assembly. The resilient fastening means of the cartridge units including springs 82 and 84 act to maintain the cap plates in snug contact with the ends of the drier or filter element, and the spring 84 is adapted for detachable engagement with a lug of one of the end plates, thereby permitting quick and easy removal of one of the cap plates for drier or filter element replacement. The refrigerant drier assembly of this invention also includes the provision of sight glass or window means for viewing dehydrated refrigerant in the central bores in the drier elements when the drier assembly is in operation. This sight glass means includes a first window in the detachable cover plate 18 and a second window in the ring assembly 92, which ring assembly is detachably engageable with the outermost cap plate of the last inserted cartridge unit. The spring 90 serves the two-fold purpose of maintaining the drier cartridge units in place in the casing and holding the ring assembly in place in the cap plate. Since the ring assembly 92 is a separate unit detachable from one of the cap plates of one drier cartridge unit, the cartridge units can be uniformly made and inserted in the casing in any order.

While the invention has been shown in but one form it will be obvious to those skilled in the art that it is not to be so limited, but on the contrary it is susceptible of various changes and modifications without departing from the spirit and scope of the appended claims.

I claim:

1. A liquid purification cartridge unit for use in a refrigerant purification assembly having a sleeve-like casing comprising, a centrally bored, cylindrical liquid purification element, an annular cap plate at each end of said element, each of which cap plates has a plurality of generally radially extending lugs substantially equally spaced around the periphery thereof, said lugs being adapted to act as spacers for locating the cartridge unit in concentric spaced relation within said casing, and a plurality of axially extending, elongated, resilient fastener members each having opposite ends thereof in engagement with the lugs of respective cap plates thereby maintaining the same in contact with the ends of the element, said fastener members serving as the sole means maintaining said cap plates in contact with said element, each cap plate including circumferentially continuous inner and outer lips extending inwardly of the unit and having therebetween an annular planar surface with a width which is substantial in relation to the width of said element, which surface is adapted for substantial coextensive contact with the corresponding surface of the cap plate of an adjacent cartridge unit.

2. A refrigerant drier assembly comprising; a sleeve-like casing having a plurality of co-linearly disposed drier cartridge units removably mounted in end-to-end relationship therein, resilient means for urging said drier cartridge units into tight end-to-end contact, a first refrigerant flow connection communicating with the interior of said casing through a side portion thereof, a second refrigerant flow connection communicating with the interior of said casing at one end thereof, a removable cover plate at the other end of said casing, each of said cartridge units including; a cylindrical drier element, an annular cap plate at each end of said drier element, each of which cap plates has a plurality of generally radially extending lugs equally spaced around the periphery thereof, said lugs being in engagement with the inside wall of said casing for locating the cartridge unit in concentric spaced relation therein, and a plurality of axially extending, elongated, resilient fastener members each having opposite ends thereof in engagement with the lugs of respective cap plates thereby maintaining the same in contact with the ends of the drier element, each of said cap plates including circumferentially continuous inner and outer lips extending inwardly of the unit and having therebetween an annular planar surface with a width which is substantial in relation to the width of said element; the planar surfaces of the cap plates at the adjacent ends of said units being in substantial coextensive contact and thereby forming a seal between the ends of said units.

3. In a refrigerant drier assembly of the type having a sleeve-like casing with at least one drier cartridge unit removably mounted therein, which cartridge unit is of the radial flow type and includes a cylindrical drier element with an axially extending central bore and with annular cap plates mounted at each end of the drier element, which casing has a first refrigerant connection communicating with the interior thereof through a side wall portion of the casing, and which casing includes a second refrigerant flow connection communicating with the interior of said casing at one end thereof, a cover plate at each end of the casing with one of the cover plates and the casing defining a chamber at one end of the cartridge unit, which one cover plate includes a centrally disposed window in axial alignment with the central bore of the drier element, the improvement comprising, a ring assembly detachably mounted in the cap plate at said one end of the cartridge unit, which ring assembly includes another window mounted therein, a coil spring coaxial with said central bore, which spring has opposite ends thereof in respective engagement with said one cover plate around the window therein and with said ring assembly around the other window therein, whereby the spring serves both to maintain the ring assembly on said one cap plate and to yieldably hold the cartridge unit in place in the casing.

References Cited by the Examiner
UNITED STATES PATENTS

| | | | |
|---|---|---|---|
| 233,195 | 10/1880 | Bradley | 292—288 |
| 2,556,292 | 6/1951 | Newcum | 210—437 |
| 2,657,808 | 11/1953 | Mankin | 210—323 |
| 2,837,214 | 6/1958 | Kasten. | |
| 3,064,819 | 11/1962 | Jones | 210—282 X |
| 3,076,550 | 2/1963 | Wilhelm | 210—232 |
| 3,088,811 | 5/1963 | Jones | 23—253 |

REUBEN FRIEDMAN, *Primary Examiner.*

SAMIH ZAHARNA, *Examiner.*

S. B. WILLIAMS, *Assistant Examiner.*